United States Patent
Schneider et al.

(10) Patent No.: US 9,579,712 B2
(45) Date of Patent: Feb. 28, 2017

(54) APPARATUS AND METHOD FOR REALIZING A PLURALITY OF RIVETED CONNECTIONS ALONG THE SURFACE OF A WORKPIECE

(71) Applicant: Premium AEROTEC GmbH, Augsburg (DE)

(72) Inventors: Michael Schneider, Lehrte (DE); Juergen Morisse, Butjadingen (DE); Torsten Halbmeyer, Oldenburg (DE); Fredo Eisenhauer, Butjadingen (DE)

(73) Assignee: Premium AEROTEC GmbH, Augsburg (DE)

( * ) Notice: Subject to any disclaimer, the term of this patent is extended or adjusted under 35 U.S.C. 154(b) by 106 days.

(21) Appl. No.: 14/351,309

(22) PCT Filed: Oct. 11, 2012

(86) PCT No.: PCT/DE2012/000989
§ 371 (c)(1),
(2) Date: Apr. 11, 2014

(87) PCT Pub. No.: WO2013/053350
PCT Pub. Date: Apr. 18, 2013

(65) Prior Publication Data
US 2014/0325810 A1  Nov. 6, 2014

(30) Foreign Application Priority Data
Oct. 13, 2011  (DE) .................. 10 2011 115 819

(51) Int. Cl.
*B23Q 17/00* (2006.01)
*B21J 15/02* (2006.01)
(Continued)

(52) U.S. Cl.
CPC ............. *B21J 15/02* (2013.01); *B21J 15/142* (2013.01); *B21J 15/28* (2013.01); *G01B 11/00* (2013.01);
(Continued)

(58) Field of Classification Search
CPC ..... G01B 11/00; G01B 11/002; G01B 11/005; G01B 11/12; G05B 19/41815;
(Continued)

(56) References Cited

U.S. PATENT DOCUMENTS 3,116,560 A * 1/1964 Matthews ................ G01B 5/18
33/534
4,753,555 A * 6/1988 Thompson .............. B23B 47/28
33/542

(Continued)

FOREIGN PATENT DOCUMENTS

| | | |
|---|---|---|
| DE | 35 35 761 C1 | 3/1987 |
| DE | 198 34 702 A1 | 2/2000 |
| JP | 01197087 A * | 8/1989 |

OTHER PUBLICATIONS

International Search Report with English translation dated Mar. 7, 2013 (5 pages).

*Primary Examiner* — Essama Omgba
(74) *Attorney, Agent, or Firm* — Crowell & Moring LLP

(57) ABSTRACT

A riveting apparatus for creating a plurality of rivet joints along the surface of a workpiece includes a tool device controllable by tool control data in order to create countersunk holes on the workpiece and to set countersunk rivets in the created countersunk holes. The riveting apparatus also includes a programmable control device to generate the tool control data for the tool device and an optical sensing device for optically sensing the workpiece surface and for supplying sensing data. The control device evaluates the sensing data in order to obtain geometric data that represent at least (Continued)

one geometric parameter of a countersunk hole that has already been created, and to correct as required the tool control data for a countersunk hole that is subsequently to be created based on the result of an evaluation of the obtained geometric data.

10 Claims, 3 Drawing Sheets

(51) Int. Cl.
    *B23P 11/00*     (2006.01)
    *B21J 15/14*     (2006.01)
    *B21J 15/28*     (2006.01)
    *G01B 11/00*     (2006.01)

(52) U.S. Cl.
    CPC .... *Y10T 29/49769* (2015.01); *Y10T 29/49956* (2015.01); *Y10T 29/53065* (2015.01); *Y10T 29/5377* (2015.01)

(58) Field of Classification Search
    CPC .......... G05B 19/4183; G05B 19/41835; G05B 19/4184; G05B 19/41875; G05B 2219/31288; G05B 2219/31447; G05B 2219/32182; G05B 2219/32407; B21J 15/02; B21J 15/28; Y10T 29/49956; Y10T 29/49769; Y10T 29/49771; Y10T 29/49778; Y10T 29/4978; Y10T 29/49764
    See application file for complete search history.

(56) References Cited

U.S. PATENT DOCUMENTS

| | | | |
|---|---|---|---|
| 4,762,261 A | 8/1988 | Hawly et al. | |
| 5,615,474 A * | 4/1997 | Kellner | G05B 19/41815 29/243.53 |
| 5,673,839 A | 10/1997 | Howard et al. | |
| 6,088,923 A * | 7/2000 | Guerin | G01B 5/201 33/542 |
| 6,092,275 A * | 7/2000 | Kellner | G05B 19/41815 227/5 |
| 6,154,279 A | 11/2000 | Thayer | |
| 6,201,214 B1 * | 3/2001 | Duffin | B23K 26/04 219/121.66 |
| 7,743,526 B2 * | 6/2010 | Foletti | B23Q 17/20 33/503 |
| 8,464,434 B1 * | 6/2013 | Kostenick | G01B 21/14 33/542 |
| 8,872,066 B2 * | 10/2014 | Humphreys | B23K 26/381 219/121.71 |
| 8,938,886 B2 * | 1/2015 | Ross | B21D 31/04 264/40.1 |
| 8,969,759 B2 * | 3/2015 | Humphreys | B23K 26/0823 219/121.7 |
| 2003/0217479 A1 * | 11/2003 | Shen | G01B 3/28 33/836 |
| 2007/0112453 A1 * | 5/2007 | Auriol | G05B 19/402 700/114 |
| 2008/0304085 A1 | 12/2008 | Mead et al. | |
| 2011/0166824 A1 | 7/2011 | Haisty et al. | |
| 2011/0309059 A1 * | 12/2011 | Humphreys | B23K 26/0823 219/121.71 |
| 2012/0085739 A1 * | 4/2012 | Humphreys | B23K 26/381 219/121.71 |
| 2014/0253913 A1 * | 9/2014 | Bergman | G01N 21/954 356/241.1 |
| 2014/0271001 A1 * | 9/2014 | Nelson | B23Q 11/0046 408/56 |
| 2015/0153728 A1 * | 6/2015 | Eckley | G05B 19/41875 700/97 |

* cited by examiner

APPARATUS AND METHOD FOR REALIZING A PLURALITY OF RIVETED CONNECTIONS ALONG THE SURFACE OF A WORKPIECE

BACKGROUND AND SUMMARY OF THE INVENTION

Exemplary embodiments of the invention relate to an apparatus and a method for effecting a plurality of rivet joints along the surface of a workpiece.

German patent document DE 35 35 761 C1 describes an automatic riveting machine with computer-assisted control of the rivet positions on a workpiece, in particular, a large-area curved workpiece (e.g., "fuselage frame"). The known automatic riveting unit comprises:

a tool device, which is controllable through tool control data, to create drill holes in the workpiece and to set rivets in the created drill holes, where this can relate, in particular, to countersunk rivets;

a control device or a computer to generate tool control data for the tool device; and an optical sensing device to optically sense the workpiece surface and to supply the sensing data.

The tool device here comprises two rivet systems that are movable by computer control—specifically, one rivet system each on each side of the workpiece that is also movable by computer control. One of the two rivet system includes a turret on which five processing functions are implemented: a) drilling and countersinking, b) sealant injection, c) rivet infeed and backup, d) special function, such as e.g., scanning the hole geometry with a camera, and e) observing functions a) through d) with a video camera.

In the known automatic riveting machine, the purpose of "scanning the hole geometry" is to determine the coordinates of the drill holes of the surface of the sample workpiece by observing the surface of a sample workpiece and storing these in a computer in order to use these coordinates when subsequently performing the automatic riveting process on the actual workpiece, i.e., the workpiece to be provided with rivets.

A similar automatic riveting machine has been disclosed in German patent document DE 198 34 702 A1. This apparatus is designed for producing a barrel-shaped structural component, such as e.g. an aircraft fuselage. The tool device in this riveting apparatus also comprises coordinated interacting riveting systems on both sides of the workpiece to be processed. However, this document does not describe the use of countersunk rivets or the use of an optical sensing device for optically sensing the workpiece surface.

An extremely important aspect in many applications relating to setting rivets is that the countersinking of the previously created countersunk hole is matched as precisely as possible to the geometry of the countersunk rivet to be set, and/or that countersinking is matched so as to achieve a desired position for the countersunk head of the set rivet relative to the workpiece surface.

If countersinking exhibits, for example, an excessively small countersinking depth, the result is what is known as a "setting head protrusion" of the subsequently set rivet, i.e., the rivet head projects to a certain degree out of the workpiece surface. Conversely, an excessively large countersinking depth produces a corresponding indentation of the workpiece surface—which is also identified as setting head recess or "negative setting head protrusion".

In the case of rivet joints, for example, along the outer surface of an aircraft fuselage shell, an excessively large setting head protrusion would significantly degrade the aerodynamic characteristics in a subsequent situation of application for the fuselage shell. In this application, having at most a very small countersunk head, or preferably no setting head protrusion at all, is a very important criterion for assessing the quality of the rivet joint. Subsequent repair of imprecisely effected rivet joints has previously resulted in considerable incurred costs during fuselage shell assembly in the production of aircraft.

In practical applications, the (positive or negative) setting head protrusion is substantially determined by the countersinking depth of the countersunk hole that is created by the tool device in terms of the specified design shape of the rivet head and the specified "countersinking angle" of the countersinking. The countersinking depth for automatic riveting machines is therefore a critical process parameter that must be taken into account in the software-controlled generation of tool control data.

In an internal company development of the applicant, the optical sensing device (e.g. a camera) for a riveting apparatus of the type referenced above is being used to determine the respective positions along the surface of the workpiece, at which positions what are known as "tacking rivets" are set. The function of these tacking rivets in the riveting process is early on to temporarily join or "tack on" reinforcement structures (e.g., stringers or frames along the inside of a fuselage shell). This tacking on can be performed, e.g. manually. The positions of the tacking rivets are then determined by the optical sensing device as the automatic riveting procedure is underway. These positions can be advantageously stored as "reference points" for the countersunk rivets to be automatically set in the programmable control device (e.g., NC control unit), then advantageously used for generating tool control data. The temporary tacking rivets can be automatically removed and replaced by countersunk rivets (by drilling out the tacking rivets, countersinking the drill hole, and setting the countersunk rivets) during the automatic riveting process.

The problem with the known riveting apparatuses of the above-described type is achieving a uniform and high-level quality for the rivet joints so as to preclude any subsequent repair work.

Exemplary embodiments of the present invention are directed to improving the quality of the rivet joints during the automatic creation of a plurality of rivet joints of the type referenced above.

The control device in the riveting apparatus according to the invention is designed to evaluate the sensing data supplied by the optical sensing device in order to obtain geometric data that represents at least one geometric parameter of an already-created countersunk hole, and to correct the tool control data for a countersunk hole subsequently to be created based on the result of an evaluation of the obtained geometric data.

As has already been explained above, the geometry of a countersunk hole that is actually created is of great significance in terms of the quality of the resulting rivet joint. Advantageously, an optical sensing device that has sometimes already been provided (for other purposes), e.g., a camera, can be utilized according to the invention to determine at least one geometric parameter (e.g., countersinking depth) of a countersunk hole that has already been created.

A subsequent evaluation of the obtained geometric data can, e.g. be easily used to determine whether or not the geometry of the given countersunk hole lies within a specified tolerance range, for example, a tolerance range stored in the control device. A control program running in the control device, e.g., can thus provide that a countersunk hole already created or countersinking be reworked before the countersunk rivet is set in the countersunk hole. This is certainly conceivable within the scope of the invention.

What is essential to the invention, however, is the approach whereby any needed correction of the tool control data is performed based on the result from evaluating the obtained geometric data for (at least) one countersunk hole that is to be created subsequently. The countersunk hole that is to be created "subsequently" can be, in particular, the countersunk hole that is to be created "immediately subsequently" when a given workpiece is being processed.

The invention thus allows for the situation where creating a large number of rivet joints along the surface of a workpiece entails the risk that one geometric parameter of the countersunk hole, such as e.g., the countersinking depth, in particular, will gradually (from rivet joint to rivet joint) "wander away" from a given specified tolerance range. This can be reliably precluded by the correction of the tool control data as provided by the invention. Whenever the evaluation shows, e.g., that the value of the countersinking depth lies relatively close to a lower limit of the associated tolerance range, an appropriate "readjustment" of the tool control data can be advantageously used to achieve an improved countersinking result (here a somewhat larger countersinking depth) for the countersunk hole(s) to be created subsequently.

The optical sensing device in one embodiment is a camera for supplying the image data. This has the advantage, e.g., that a camera that is already provided in any case (e.g. for monitoring purposes and/or for "tacking rivet identification") can be utilized according to the invention simultaneously, with the result that no added expense is incurred thereby in terms of constructive design. As an alternative to a camera, another optical measurement system can also be employed as long as its measurement data can be evaluated in order to obtain geometric data (e.g. laser field sensors, etc.).

In one embodiment, the geometric parameter is the countersinking depth of the countersunk hole. Alternatively or additionally, the countersinking diameter of the countersunk hole can also be provided as the geometric parameter.

In the case that is especially frequent in practical terms where the countersunk holes are each created with properly (precisely) defined values for hole diameter and countersinking angle, determining the countersinking diameter is equivalent to determining the countersinking depth of the countersunk hole. Each of these two geometric parameters can be calculated from the respective other geometric parameter.

In one embodiment the evaluation of the sensing data is performed in such a way that the countersinking diameter and the countersinking depth are determined independently. It is true that these determinations are redundant in the case of a countersinking angle that is assumed to be known. This redundancy can be exploited, however, to enhance the precision of measurement and/or for a plausibility check on the measurement.

In one specific embodiment the control device is designed to first determine a countersinking diameter of the countersunk hole based on the sensing data in order then to determine therefrom a countersinking depth of the countersunk hole while taking into account a countersinking angle of the countersunk hole.

In one embodiment in order to evaluate the geometric data the value of at least one actual geometric parameter is compared with the value of a corresponding desired geometric parameter, and the correction of the tool control data is effected based on a result from this comparison.

In one embodiment an actual value for the countersinking depth found in the geometric data is compared with a value of a specified desired countersinking depth.

Based on a determined actual value/desired value difference, it is thus possible for the control device to generate by software-controlled means correction data (that is, e.g., characteristic of the degree of this difference) in order to use these correction data to correct or "update" the tool control data stored in the control device.

Although the preferred approach is one where the correction of the tool control data is performed at least for a countersinking depth of the countersunk hole to be created subsequently, the approach should clearly not be excluded according to the invention where, in the manner described, other geometric parameters of the countersunk hole are utilized alternatively or additionally. In particular, e.g., the above-described actual value/desired value comparison can also be effected for the countersinking diameter alternatively or additionally to the countersinking depth.

The method according to the invention for creating a plurality of rivet joints along the surface of a workpiece comprises the steps:

creating countersunk holes in the workpiece and setting countersunk rivets in the created countersunk holes using a tool device that is controlled by tool control data;

software-controlled generation of tool control data for the tool device;

optical sensing of the workpiece surface in order to supply sensing data (e.g., image data provided by a camera);

evaluating the sensing data to obtain geometric data that represents at least one geometric parameter (e.g. (at least) one countersinking depth and/or (at least) one countersinking diameter of a countersunk hole that has already been created;

evaluating the obtained geometric data; and correcting the tool control data for a countersunk hole that is subsequently to be created based on the result of evaluating the geometric data (e.g., for the purpose of achieving the desired countersinking depth(s) or the desired countersinking diameter(s).

Correction of the tool control data is preferably provided in the form of a closed control loop. This preferably uses a (high) "control frequency" at which the result from evaluating the geometric data for a given countersunk hole produces any required correction of the tool control data quickly enough that the corrected or updated tool control data can already be utilized for the immediate subsequent creation of the next countersunk hole.

Instead of effecting a correction only based on an evaluation of the specific geometric data obtained for the last-created countersunk hole, another possible approach is to utilize the sensing data provided for multiple countersunk holes and/or obtained evaluation results and/or generated correction data—e.g., after producing a weighted average—for the correction of the tool control data.

A preferred use of an apparatus and/or a method of the type described above is the creation of a plurality of rivet joints between an extensive planar component and a longitudinally extended reinforcement element that is mounted on the flat side of the component, in particular, in connection with producing a reinforced fuselage shell of a vehicle, in particular, an aircraft.

BRIEF DESCRIPTION OF THE DRAWING FIGURES

The following discussion further describes the invention based on exemplary embodiments with reference to the attached drawing. Here:

DETAILED DESCRIPTION

Figure 1:
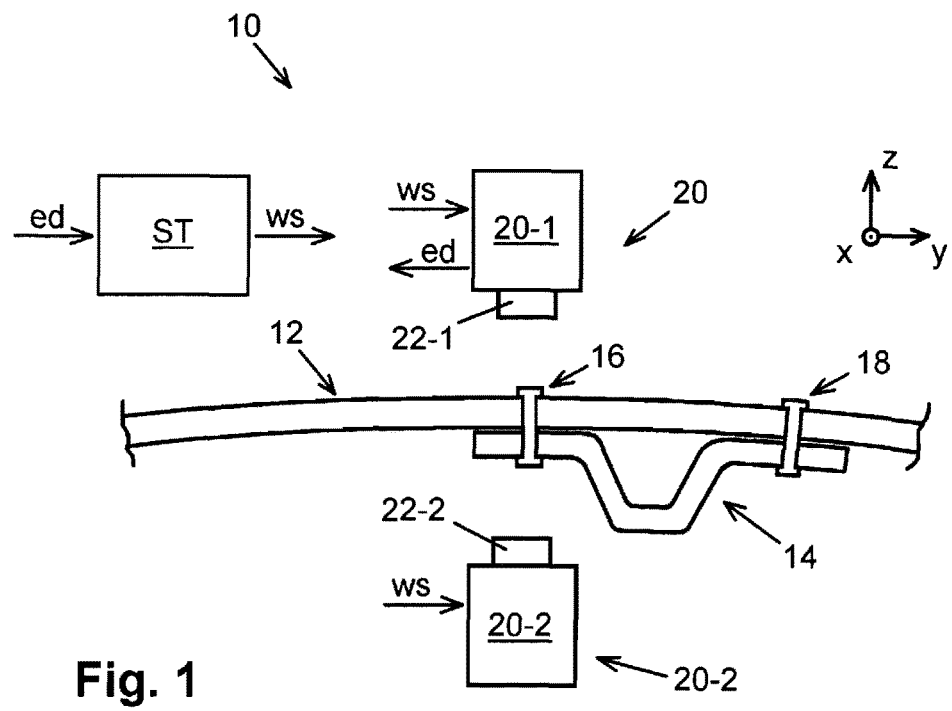
FIG. 1 is a schematic view of an automatic riveting machine in a first embodiment, together with a workpiece to be processed.

FIG. 1 depicts an automatic riveting machine 10 for creating a plurality of rivet joints along the surface of a workpiece.

The workpiece in the example shown is a fuselage shell 12 of an aircraft where rivet joints attach reinforcement sections along the inside of fuselage shell 12. Identified in the drawing of FIG. 1 by way of example is a so-called stringer 14.

Stringer 14 in the situation shown in FIG. 1 has been temporarily attached to fuselage shell 12 by a series of tacking rivets. Two tacking rivets 16 and 18 that have, for example, been previously set manually are depicted in FIG. 1 by way of example.

Riveting machine 10 comprises a tool device 20 that is controllable by tool control data "ws", which device comprises a first tool system 20-1 and a second tool system 20-2.

Tool systems 20-1 and 20-2 are each disposed on one side of the workpiece to be processed (here fuselage shell 12 together with stringer(s) 14) and can be controlled by tool control data "ws" in a manner coordinated relative to each other in order to create the desired rivet joints.

Each of tool systems 20-1 and 20-2 can be moved by tool control data "ws", for example, in at least one of three spatial axes x, y, and z, where both straight-line and also curved travel paths are possible that can be implemented by appropriate guiding devices (not shown). Alternatively or additionally to this movability of tool systems 20-1 and 20-2, it is also possible to provide swivelability about at least one angle for at least one of systems 20-1 and 20-2.

Independently thereof, it is also possible to provide a movable and/or swivelable support for the workpiece, here fuselage shell 12.

Known motion or swivel designs can be advantageously utilized such as those, e.g., described in the above-referenced documents relating to the prior art. Ultimately the only requirement is that tool systems 20-1 and 20-2 can be positioned relative to the actual workpiece in a way that is matched to the specific application in order to function as a "riveting tool."

The actual processing of the workpiece composed of fuselage shell 12 and stringer(s) 14 is effected by tool heads 22-1 and 22-2 of tool systems 20-1 and 20-2, which tool heads face the workpiece.

Tool heads 22-1 and 22-2 can each include, e.g., an arrangement of mutually adjacent individual tools or also, e.g., a turret arrangement of these individual tools.

The purpose of tool device 20 is to create countersunk holes on workpiece 12 and to set countersunk rivets in the countersunk holes that are created.

Riveting machine 10 furthermore comprises a programmable control device ST to generate required tool control data "ws" that is transmitted to tool device 20 in order to control tool systems 20-1 and 20-2.

Tool head 22-1 of tool system 20-1 in the example shown, in particular, comprises (at least) one so-called "chamfering tool", or alternatively one drill and one countersink, in order to create the required countersunk holes on the workpiece. In addition, tool head 22-1 comprises a tool to set countersunk rivets (in the previously created countersunk holes), that is, to effect "rivet infeed" and "backup".

Tool head 22-2 used on the other side of workpiece 12 for setting a rivet comprises, in particular, a so-called "rivet header" to buck the "snap head" of the specific rivet located on the side of the rivet opposite the "setting head" (here: countersunk head).

In addition, an optical sensing device for optically sensing the workpiece surface and supplying corresponding sensing data "ed" is provided on first tool system 20-1, for example, as one of the components of tool head 22-1.

This optical sensing device, for example, a video camera, is used in the described example to determine those positions on the surface of workpiece 12 on which the referenced tacking rivets are disposed, that is, the tacking rivets 16, 18 shown in FIG. 1. This determination is performed by an appropriate software-controlled evaluation of the sensing data (here image data) from the optical sensing device. The evaluation is performed based on an appropriate evaluation algorithm that runs in control device ST to which sensing data "ed" is being fed for this purpose.

When the riveting method is subsequently performed, a software control program running in control device ST for generating tool control data "ws" advantageously uses the previously determined positions of the tacking rivets as "reference points" for the countersunk rivets to be automatically set.

As the riveting process proceeds, the tacking rivets are removed using tool device 20 and replaced by countersunk rivets at each same location. In the illustrated example this is implemented by drilling out the tacking rivets, countersinking a final appropriate countersunk hole, and finally setting, i.e., feeding in and bucking a matching countersunk rivet.

Figure 2:
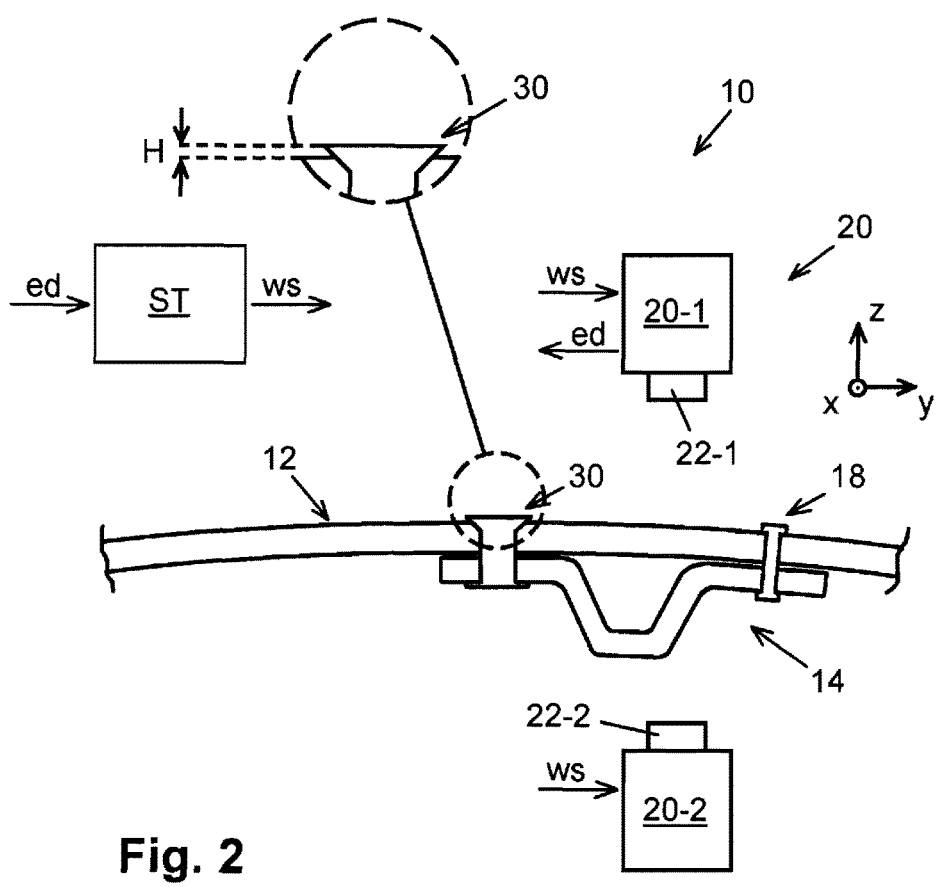
FIG. 2 is a view based on FIG. 1 after replacing a tacking rivet with a countersunk rivet.

FIG. 2 illustrates a situation in which riveting machine 10 has already been used to replace tacking rivet 16 with a countersunk rivet 30. As the riveting process continues, tacking rivet 18, in particular, is then removed and replaced by a countersunk rivet. A plurality of additional countersunk rivets is furthermore set automatically, for example, along connecting lines between the positions of the originally set tacking rivets (these positions along the connecting lines as well as the connecting lines themselves can be advantageously computed from the tacking rivet positions that were previously stored and serve as reference points).

The enlarged detail in FIG. 2 illustrates the basic problem where, depending on the functional precision of tool device 20, an unwanted "setting head protrusion" H can be present on rivet 30 that was already set.

Despite the fact that ideally no unwanted setting head protrusion should result when the appropriately running control program (for generating control data "ws") accounts for the geometry or the constructive design of the workpiece to be riveted, it must be realized that this ideal case is difficult to achieve in practice.

The purpose of the embodiment according to the invention is to provide a high-level and uniform quality for the rivet joints when creating a series of these rivet joints (see rivet 30 in FIG. 2) along the surface of workpiece 12, where, in particular, setting head protrusion H in the illustrated example should be maintained within a narrow specified tolerance range so as to preclude any subsequent repairs due to an excessively large or excessively small (negative) setting head protrusion.

To this end, control device ST or the control software running therein is designed to evaluate sensing data "ed" in order to obtain geometric data that represent at least one geometric parameter, here countersinking depth T (see FIG. 3), of an already-created countersunk hole. The obtained geometric data from control device ST are then evaluated. As needed, correction data are then generated based on the result of the evaluation and used to correct tool control data "ws" for a countersunk hole that is subsequently to be created. The distinguishing feature of riveting machine 10 or of the method implemented therewith is again described in more detail below based on FIG. 3 through FIG. 5.

Figure 3:
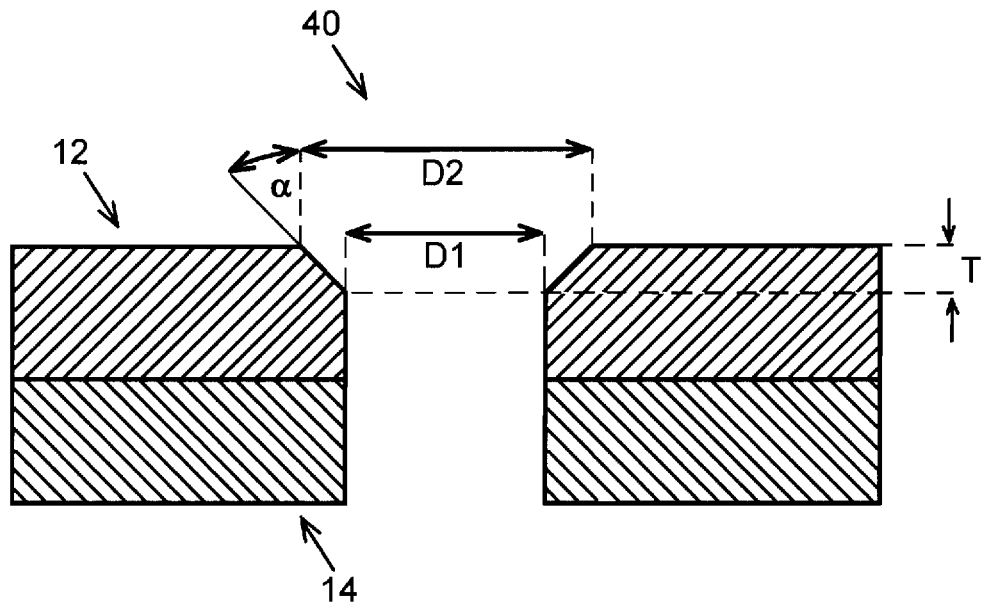
FIG. 3 is a view illustrating the geometric conditions in a countersunk hole.

FIG. 3 illustrates the geometry of countersunk hole 40 on workpiece 12. There following geometric parameters are evident here:

D1: hole diameter ("inside diameter" of countersunk hole 40)

D2: countersinking diameter ("outside diameter" of countersunk hole 40)

α: countersinking angle of countersunk hole 40

T: countersinking depth of countersunk hole 40.

It is easily seen that the following relationship applies for the geometric parameters so defined:

$$(D2-D1)/2 = T * \tan(\alpha)$$

The values D1 and α are set relatively precisely if the countersunk hole is created, in particular, by a countersink. It is assumed that D1 and α are known, and thus countersinking depth T can be easily calculated from the determination of D2 (and/or, e.g., the difference D2−D1) that is effected based optical sensing data "ed".

Also conversely: if countersinking depth T has been determined directly based on optical sensing device "ed", D2 can be calculated therefrom as another geometric parameter D2 (and/or alternatively, e.g., D2−D1).

The goal of the described example is to achieve a high-level and consistent precision (in terms of the plurality of rivet joints to be implemented) when creating countersunk holes 40, in particular, including for the values of T or D2.

The camera in the illustrated embodiment (optical sensing device of riveting machine 10) supplies image data from the surface of workpiece 12.

Figure 4:
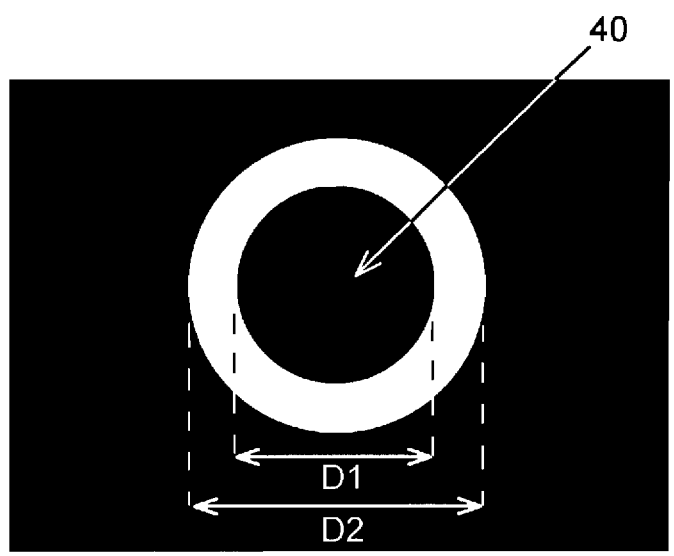
FIG. 4 depicts an image captured by a camera of the automatic riveting machine.
Figure 5:
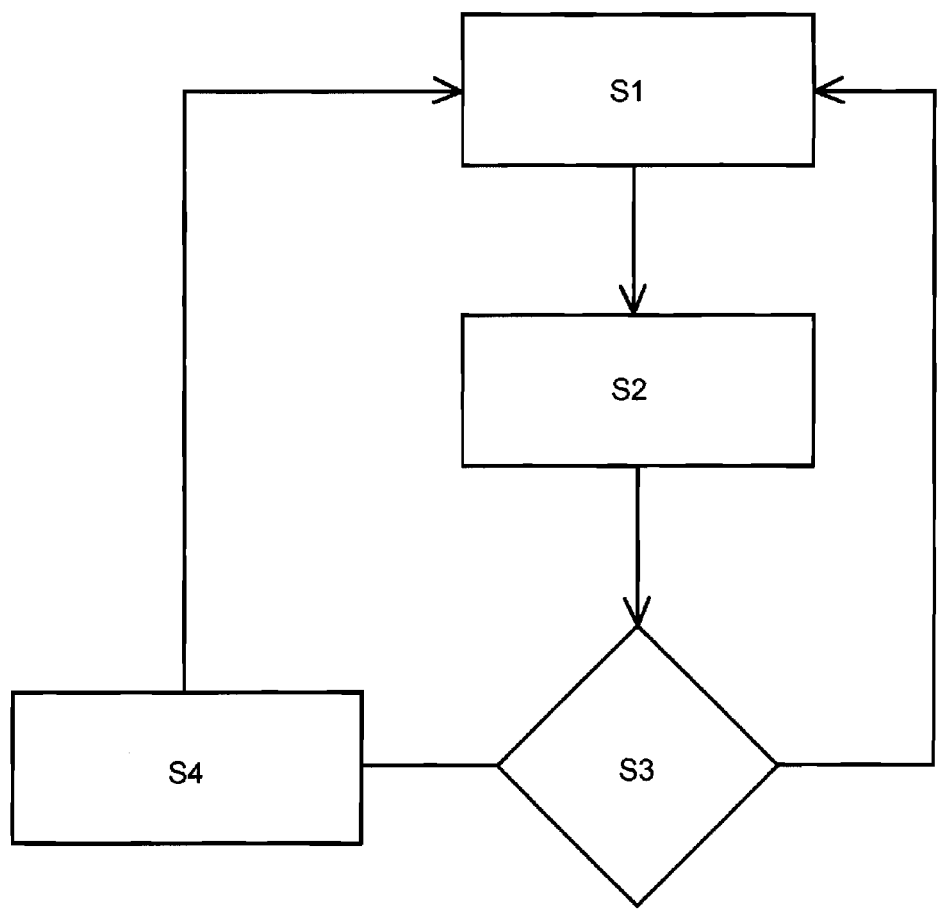
FIG. 5 is a flowchart of the riveting method effected by the riveting machine.

FIG. 4 depicts an example of this type of "image" of the workpiece surface in the region of countersunk hole 40 that has already been created.

Corresponding image data "ed" are evaluated by an evaluation algorithm running in control device ST to determine the value of one or more geometric parameters. The following discussion assumes that, e.g., the value of countersinking diameter D2 is determined by this evaluation and incorporated in the obtained geometric data.

Hole diameter D1 and countersinking angle α are known by control device ST since the control means of tool device 20 comprises, in particular, the specific selected countersink (or alternatively a specified combination of drill and countersink) if tool device 20 includes multiple different tools of this type.

Together with the known values for hole diameter D1 and countersinking angle α, countersinking depth T is then computed by control device ST and compared with a specified value for a desired countersinking depth T0 (this value T0 can be stored in the control device). This comparison is used to obtain correction data that are representative of an actual value/desired value T−T0. The result from this evaluation of geometric data, in other words here, e.g., the difference T−T0, is then used to correct tool control data "ws" for a countersunk hole to be subsequently created.

Whenever, e.g., previously "measured" countersunk hole 40 exhibits an actual countersinking depth T that is larger than the specified desired countersinking depth T0 for this countersunk hole 40, an improved quality can immediately be achieved in terms of the countersinking depth by correcting or updating tool control data "ws" for the next countersunk hole to be created.

As a result, a "closed control loop" is implemented so that a continuous monitoring and any required correction of the tool control data "ws" are effected—preferably during the processing of the same actual workpiece 12.

FIG. 5 is a flowchart again showing the essential steps of the described riveting method.

The process starts with step S1 in which a countersunk hole is created at a specified site on workpiece 12 as determined by the control program.

In step S2, sensing data (e.g., image data) are supplied and evaluated by the optical sensing device, e.g., a camera, in order to obtain geometric data containing the value of at least one geometric parameter, here, e.g., countersinking depth T.

In step S3, this countersinking depth T is compared with appropriate desired value T0, and a decision is made as to whether any correction of tool control data "ws" is required. If this is not true, tool control data "ws" are not changed in this way, and, after moving to the position designated by the program control sequence, the process then moves back to step S1 for the next countersunk hole to be created. Otherwise, that is, whenever a correction is indicated, the process moves to step S4 in which the relevant control parameter(s) are appropriately adjusted in tool control data "ws". What happens in this example is that a correction of that control parameter is therefore made as this point which determines countersinking depth T to be created. Only then does the process return to step S1, with the result that the effected correction is advantageously utilized for the creation of additional countersunk holes yet to be created during the overall sequence.

Regardless of the fact that the invention has been described based on a specific embodiment, the details can be modified in a variety of ways. In particular, the invention can be used both for single-part rivets and also multi-part rivets (e.g., so-called tolerance rivets). Although the countersunk holes in the described example are each composed of a (single) cylindrical hole section and a (single) conical countersunk section, even more complex design shapes are possible within the scope of the invention for the countersunk holes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A riveting apparatus for creating a plurality of rivet joints along the surface of a workpiece, comprising:
   a tool device that is controllable by tool control data in order to create countersunk holes on the workpiece and to set countersunk rivets in the created countersunk holes;
   a programmable control device configured to generate the tool control data for the tool device; and
   an optical sensing device configured to optically sense the workpiece surface and supply sensed data to the programmable control device,
   wherein the control device is configured to
      evaluate the sensed data in order to obtain geometric data of a countersunk hole that has already been created,
      determine at least a first geometric parameter and at least a second geometric parameter independently from the first geometric parameter using the obtained geometric data,
      determine whether the first geometric parameter is accurate using the independently determined second geometric parameter,
      determine whether correction data to be used for a countersunk hole subsequently to be created should be generated based on a comparison between at least one actual geometric parameter of the countersunk hole that has already been created and a corresponding specified desired geometric parameter,
      generate the correction data based on the determination, and
      correct the tool control data for the countersunk hole subsequently to be created using the correction data.

2. The riveting apparatus of claim 1, wherein the optical sensing device is a camera that supplies image data.

3. The riveting apparatus of claim 1, wherein the at least first geometric parameter or the at least second geometric parameter is a countersinking depth of the countersunk hole that has already been created.

4. The riveting apparatus of claim 1, wherein the at least first geometric parameter or the at least second geometric parameter is a countersinking diameter of the countersunk hole that has already been created.

5. The riveting apparatus of claim 1, wherein the control device is configured to first determine a countersinking diameter of the countersunk hole that has already been created based on the sensed data in order then to determine, based on the determined countersinking diameter, a countersinking depth of the countersunk hole that has already been created by taking into account a countersinking angle of the countersunk hole that has already been created.

6. The riveting apparatus of claim 1, wherein the tool control data is corrected for a countersinking depth of the countersunk hole that is subsequently to be created.

7. The riveting apparatus of claim 1, wherein the correction is a closed control loop correction.

8. The riveting apparatus of claim 1, wherein the workpiece is an extensive planar component and a longitudinally extended reinforcement element that is mounted on the flat side of the component.

9. The riveting apparatus of claim 8, wherein the extensive planar component and the longitudinally extended reinforcement element form a reinforced fuselage shell of a an aircraft.

10. A method for creating a plurality of rivet joints along the surface of a workpiece, comprising the steps of:
    creating countersunk holes in the workpiece;
    setting countersunk rivets on the created countersunk holes using a tool device that is controlled by tool control data;
    generating, by a control device, the tool control data for the tool device;
    optical sensing, by an optical sensor, the workpiece surface in order to supply sensed data;
    evaluating, by the control device, the sensed data to obtain geometric data of a countersunk hole that has already been created;
    determining, by the control device, at least a first geometric parameter and at least a second geometric parameter independently from the first geometric parameter using the obtained geometric data;
    determining, by the control device, whether the first geometric parameter is accurate using the independently determined second geometric parameter;
    determining, by the control device, whether correction data to be used for a countersunk hole that is subsequently created should be generated based on a comparison between at least one actual geometric parameter of the countersunk hole that has already been created and a corresponding specified desired geometric parameter;
    generating, by the control device, the correction data based on the step of determining; and
    correcting, by the control device, the tool control data for the countersunk hole that is subsequently to be created using the correction data.

* * * * *